(12) United States Patent
Elliott et al.

(10) Patent No.: US 8,559,932 B2
(45) Date of Patent: Oct. 15, 2013

(54) SELECTIVE ALERT PROCESSING

(75) Inventors: Doron M. Elliott, Detroit, MI (US); Ivette Hernandez, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 232 days.

(21) Appl. No.: 12/972,870

(22) Filed: Dec. 20, 2010

(65) Prior Publication Data
US 2012/0157069 A1 Jun. 21, 2012

(51) Int. Cl.
*H04M 3/00* (2006.01)

(52) U.S. Cl.
USPC ...... 455/418; 455/466; 455/456.1; 455/67.11

(58) Field of Classification Search
USPC .............. 455/418, 420; 340/439, 425.5
See application file for complete search history.

(56) References Cited

U.S. PATENT DOCUMENTS

| | | | |
|---|---|---|---|
| 6,353,778 B1 * | 3/2002 | Brown | 701/1 |
| 6,539,078 B1 | 3/2003 | Hunt et al. | |
| 6,668,221 B2 | 12/2003 | Harter, Jr. et al. | |
| 6,687,497 B1 * | 2/2004 | Parvulescu et al. | 455/420 |
| 6,842,677 B2 | 1/2005 | Pathare | |
| 6,903,652 B2 | 6/2005 | Noguchi et al. | |
| 7,194,069 B1 | 3/2007 | Jones et al. | |
| 7,246,062 B2 | 7/2007 | Knott et al. | |
| 7,337,113 B2 | 2/2008 | Nakagawa et al. | |
| 7,565,230 B2 | 7/2009 | Gardner et al. | |
| 7,764,189 B2 | 7/2010 | Rubins et al. | |
| 7,783,475 B2 | 8/2010 | Neuberger et al. | |
| 7,826,945 B2 | 11/2010 | Zhang et al. | |
| 7,830,271 B2 | 11/2010 | Rubins et al. | |
| 7,881,940 B2 | 2/2011 | Dusterhoff | |
| 8,116,437 B2 | 2/2012 | Stillman et al. | |
| 8,285,453 B2 | 10/2012 | Schroeder et al. | |
| 2003/0004730 A1 | 1/2003 | Yuschik | |
| 2003/0055643 A1 | 3/2003 | Woestemeyer et al. | |
| 2003/0099335 A1 | 5/2003 | Tanaka et al. | |
| 2003/0220725 A1 | 11/2003 | Harter, Jr. et al. | |
| 2004/0176906 A1 | 9/2004 | Matsubara et al. | |
| 2005/0125110 A1 | 6/2005 | Potter et al. | |
| 2006/0142917 A1 | 6/2006 | Goudy | |
| 2007/0072553 A1 * | 3/2007 | Barbera | 455/67.11 |
| 2007/0072616 A1 | 3/2007 | Irani | |

(Continued)

OTHER PUBLICATIONS

Driver Focus-Telematics Working Group, Statement of Principles, Criteria and Verification Procedures on Driver Interactions with Advanced In-Vehicle Information and Communications Systems, Including 2006 Updated Sections, Jun. 26, 2006.

(Continued)

*Primary Examiner* — David Q Nguyen
(74) *Attorney, Agent, or Firm* — Jennifer M. Stec; Brooks Kushman P.C.

(57) ABSTRACT

A computer-implemented method includes receiving, at a vehicle computing system, a notification that an incoming communication is being sent to a wireless device in communication with the vehicle computing system. The method also includes determining that a do not disturb function is active in the vehicle computing system and blocking a notification to a driver regarding the incoming communication. Finally, this method includes sending a command from the vehicle computing system to the wireless device to silence any notification that the wireless device provides in conjunction with the incoming communication.

12 Claims, 5 Drawing Sheets

(56) References Cited

U.S. PATENT DOCUMENTS

| | | |
|---|---|---|
| 2007/0255568 A1 | 11/2007 | Pennock |
| 2008/0070616 A1 | 3/2008 | Yun |
| 2009/0085728 A1* | 4/2009 | Catten et al. ............... 340/425.5 |
| 2009/0275281 A1 | 11/2009 | Rosen |
| 2010/0191535 A1 | 7/2010 | Berry et al. |
| 2010/0210254 A1 | 8/2010 | Kelly et al. |
| 2010/0233959 A1 | 9/2010 | Kelly et al. |
| 2011/0003587 A1 | 1/2011 | Belz et al. |
| 2011/0009107 A1* | 1/2011 | Guba et al. .................... 455/418 |
| 2011/0076996 A1* | 3/2011 | Burton et al. ................. 455/418 |
| 2011/0084852 A1 | 4/2011 | Szozerba |
| 2011/0115618 A1* | 5/2011 | Catten et al. ................. 340/439 |
| 2011/0166748 A1 | 7/2011 | Schneider et al. |
| 2011/0212737 A1* | 9/2011 | Isidore .......................... 455/466 |
| 2012/0041633 A1 | 2/2012 | Schunder et al. |

OTHER PUBLICATIONS

Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem", Automotive Design & Production, Oct. 2003, http://findarticles.com, pp. 1-3.

* cited by examiner

SELECTIVE ALERT PROCESSING

BACKGROUND

The illustrative embodiments generally relate to selective alert processing.

Many states and localities have passed laws prohibiting the use of cellular phones while driving (without a hands-free connection), prohibiting texting while driving, and generally discouraging cellular phone usage while operating a moving vehicle.

In response to this, drivers are now frequently seeking out hands-free connectivity for their portable wireless devices, such that calls can more safely be made while operating a vehicle. In some advanced connectivity solutions, such as the FORD SYNC system, the vehicle computing system, in communication with a wireless device, is actually capable of reading incoming text messages to a driver, as well as handling incoming calls.

Despite the fact that hands-free systems, such as the FORD SYNC system, make phone usage while driving more safe, there are times when a driver may not wish to interact with a wireless device while operating a vehicle. For example, without limitation, in severe weather, when distracted by children, or when in chaotic traffic or a new, unfamiliar area, a driver may want to simply turn a phone off to avoid distraction from incoming calls or messages.

SUMMARY

The illustrative embodiments present an alternative to simply disabling or powering-down a wireless device.

In a first illustrative embodiment, a computer-implemented method includes receiving, at a vehicle computing system, a notification that an incoming communication is being sent to a wireless device in communication with the vehicle computing system. The exemplary method also includes determining that a do not disturb function is active in the vehicle computing system and blocking a notification to a driver regarding the incoming communication.

Finally, this illustrative embodiment includes sending a command from the vehicle computing system to the wireless device to silence any notification that the wireless device provides in conjunction with the incoming communication.

In a second illustrative embodiment, a vehicle computing apparatus includes receiving programmed logic circuitry to receive a notification that an incoming communication is being sent to a wireless device in communication with the vehicle computing apparatus. This embodiment also includes determining programmed logic circuitry to determine that a do not disturb function is active in the vehicle computing apparatus.

The second illustrative embodiment further includes blocking programmed logic circuitry to block a notification to a driver regarding the incoming communication. Finally, this illustrative embodiment includes sending programmed logic circuitry to send a command from the vehicle computing system to the wireless device to silence any notification that the wireless device provides in conjunction with the incoming communication.

In a third illustrative embodiment, a computer-implemented method includes receiving, at a vehicle computing system, a notification that an incoming communication is being sent to a wireless device in communication with the vehicle computing system.

This illustrative embodiment also includes determining that a do not disturb function is active in the vehicle computing system. The embodiment further includes determining if the party sending the incoming communication is on an allowed party list.

Finally, this embodiment includes sending a notification to a driver regarding the incoming communication, conditional on the party sending the communication being on the allowed list.

DETAILED DESCRIPTION

Figure 1:
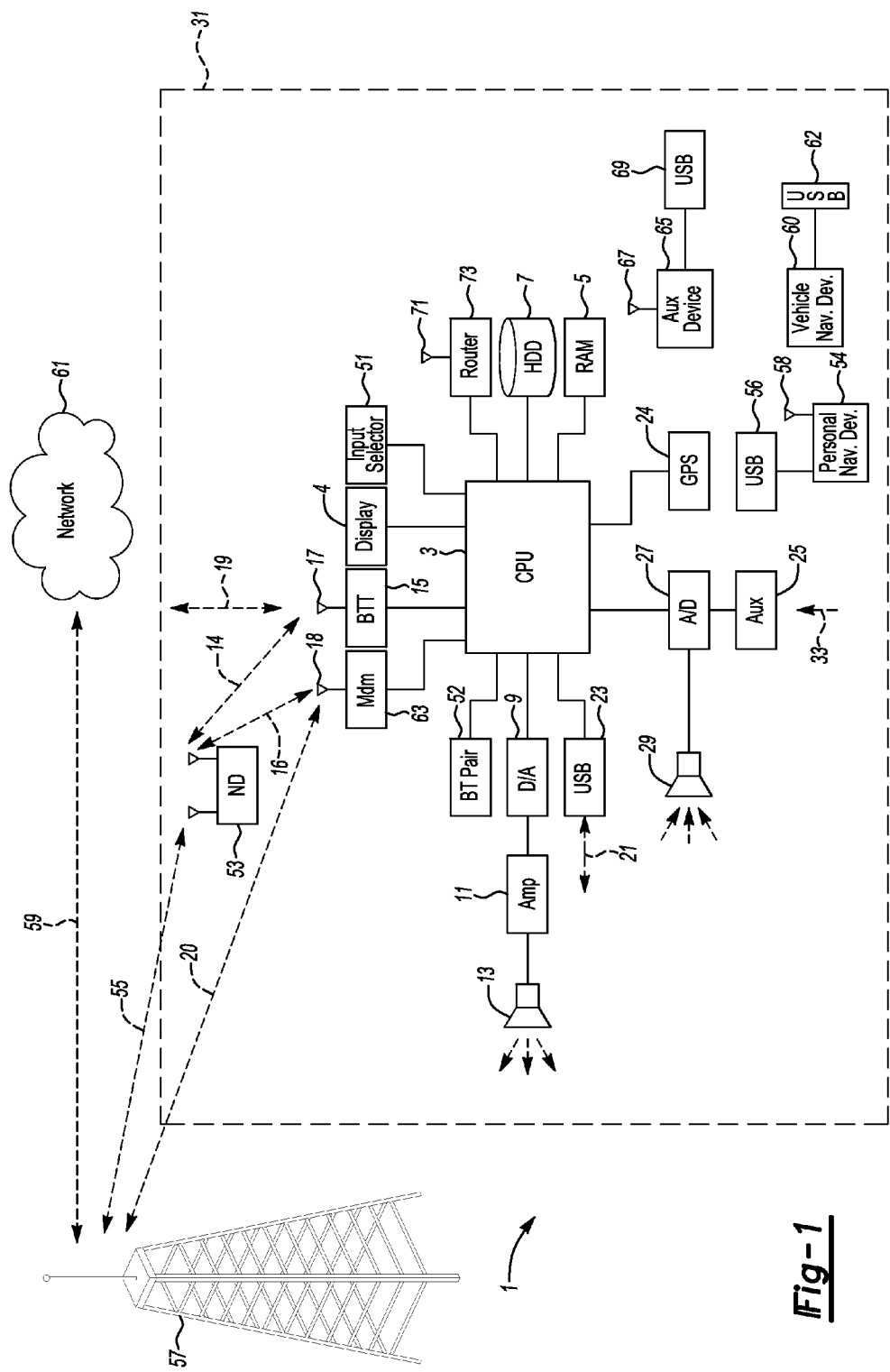
FIG. 1 illustrates an example block topology for a vehicle based computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

The illustrative embodiments present an alternative to simply disabling or powering-down a wireless device. Instead, the driver is able to put a wireless device into "ignore" mode, or a "selective ignore" mode, whereby some or all calls and/or messages are ignored. This avoids the hassle sometimes encountered in powering a phone up and down (e.g., delays in start-up, missed messages, etc.). Further, in at least one illustrative embodiment, the driver can be notified of any calls, messages, etc. that were missed while the phone was in this mode.

Figure 2:
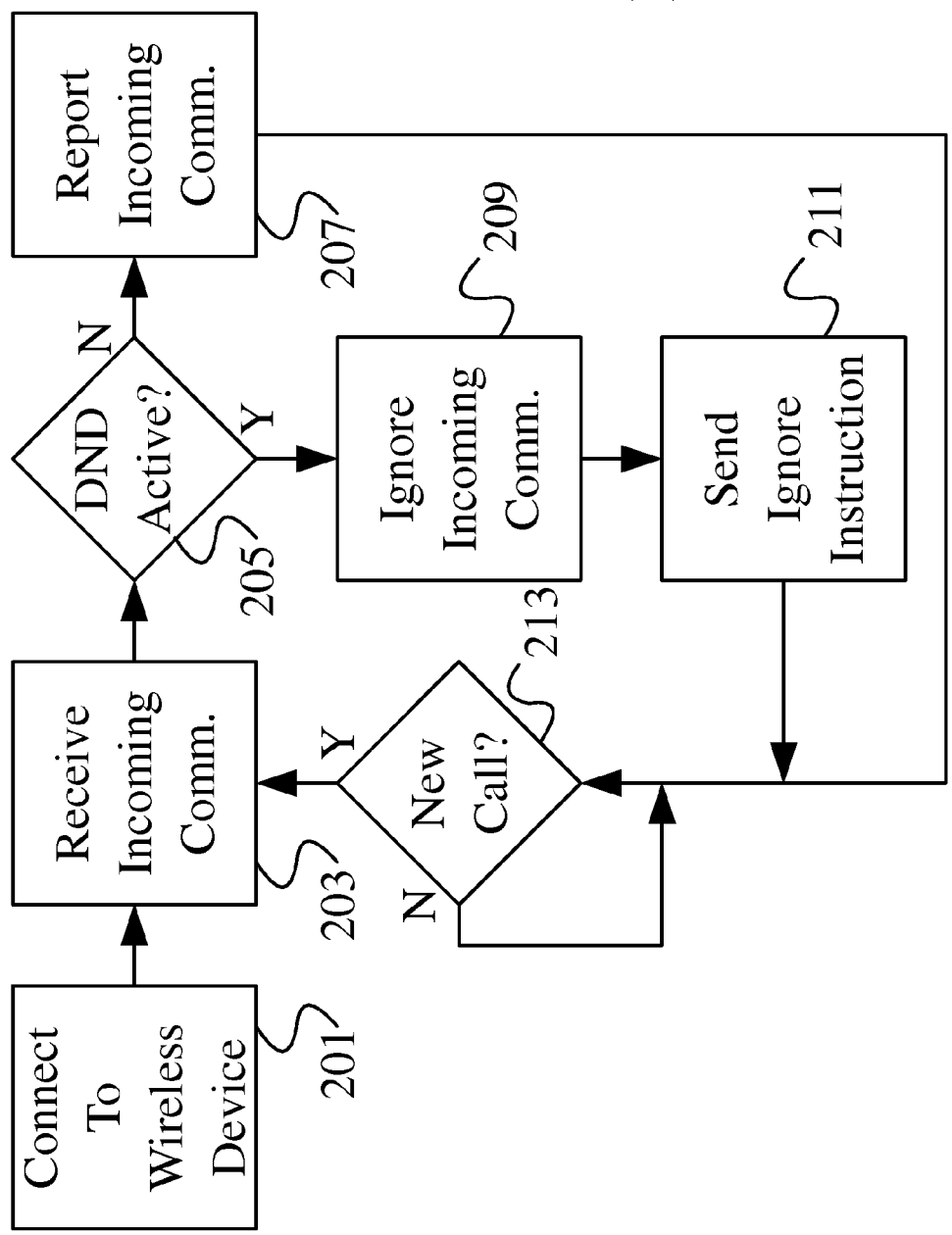
FIG. 2 shows an illustrative example of a do not disturb function.

In a first illustrative embodiment, shown in FIG. 2, a simple do not disturb function is presented. This function is activated through a vehicle computing system, using, for example, without limitation, a control on the steering wheel, a touch control on a navigation display, a verbal command, etc. Once active, the vehicle computing system will not report incoming calls or messages, and it will instruct the wireless device connected thereto to mute the ring, send the call to voicemail, reject the call, etc.

In this illustrative embodiment, the vehicle computing system connects to a wireless device 201. This connection process is described in more detail with respect to FIG. 1. Once the computing system is connected, it may detect an incoming call or message signal 203 (messages can be text messages, email messages, IM messages, etc.).

When the incoming message signal is detected 203, the system checks to see if a do not disturb function is active 205. The do not disturb function may have been activated through a driver verbal command, use of a manual input, or even in response to a hazardous or potentially hazardous condition detected by a vehicle sensor. For example, the driver may be uncomfortable driving in heavy rain, so the driver may have the system automatically enable do not disturb whenever conditions correspondent with heavy rain are detected by one or more vehicle sensors.

If do not disturb is active, the system will ignore the incoming call or message 209. That is, the system will not report to the driver that a call or message is incoming, so as not to distract the driver. Additionally, since a ringing or beeping wireless device could still distract the driver, the system may also relay a command to the wireless device to reject the call 211 (which could include bypassing a notification signal, sending the call to voicemail without notification, muting a notification signal, etc.).

The bypass may cause the call to go directly to voicemail, or simply mute the signal. It's also possible that one or more rings or partial rings may escape the device before the device is notified by the system, but the system will generally try to avoid this (at least, in this illustrative embodiment), by relaying the "mute" command as quickly as possible. In other illustrative embodiments the wireless device may go unaffected and alert the driver as usual.

When the incoming communication has been dealt with, the system waits for another call 213.

Figure 3:
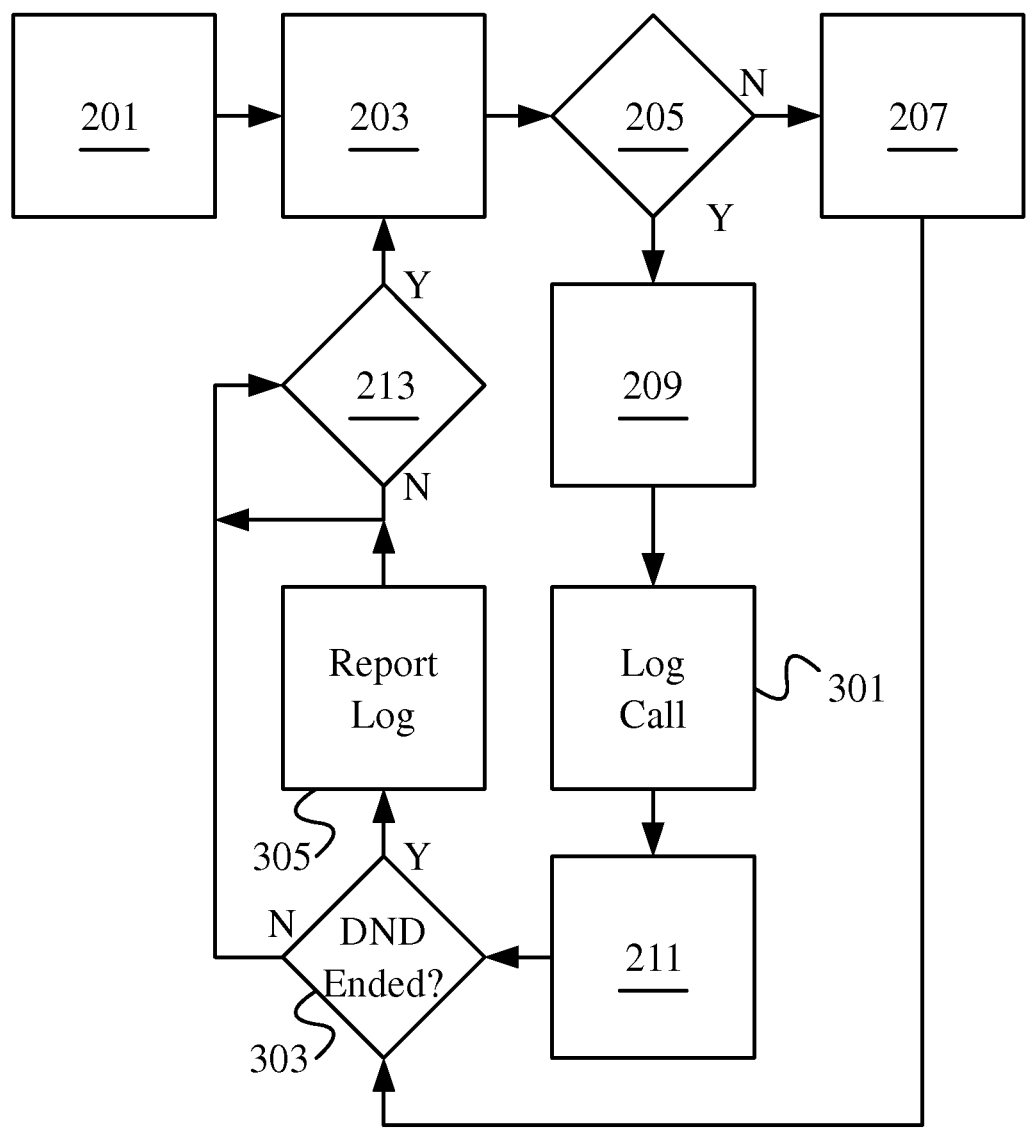
FIG. 3 shows a second illustrative embodiment in which a call/message log is created.

FIG. 3 shows a second illustrative embodiment in which a call/message log is created when calls are "ignored" by the do not disturb function. In this illustrative embodiment, the system may generally function as the exemplary system from FIG. 2. The system will connect to a wireless device 201, receive and incoming call 203, and report the call/message 207 if the do not disturb function is inactive 205.

If do not disturb is active 205, however, then in this illustrative embodiment, prior to ignoring the call 209 and sending an instruction for the ringer to be muted 211, the system will create a log of the call 301. This log can be created on an on-board memory (such as, but not limited to, a HDD or RAM) or the log could be created on the memory of the wireless device.

In this illustrative embodiment, the system checks to see if the do not disturb function has been disabled or ended 303. If the do not disturb function has ended 303, then the illustrative system reports the call/message log to the driver. This report can include, but is not limited to, an audio output, a visual display on, for example, a navigation system window, etc.

If the do not disturb function has not ended 303, then the system checks to see if a call is incoming 213. While waiting for an incoming call, the system (in this illustrative embodiment), periodically checks to see if the do not disturb function has ended. Once a call comes in, the call is handled as described previously with respect to FIG. 3.

Figure 4:
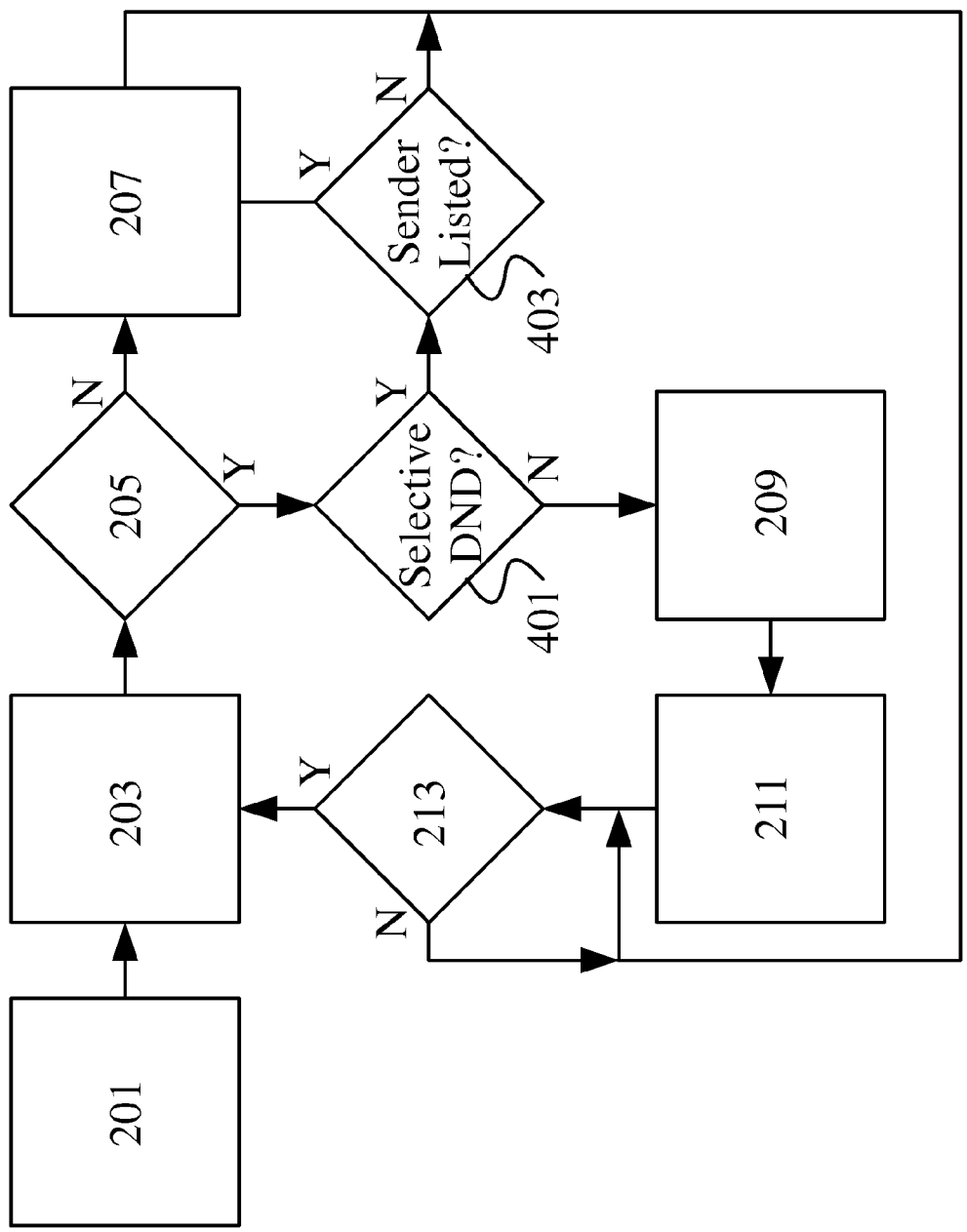
FIG. 4 shows an illustrative, non-limiting example of a selective do not disturb function.

FIG. 4 shows an illustrative, non-limiting example of a selective do not disturb function. In this illustrative embodiment, a selective do not disturb function has been enabled, such that only some calls/messages are filtered out. The user can, for example, create lists of "priority" calls and or message senders, and if a call or message comes in from one of those sources, then the system can "allow" that call to process. The lists could be created on a PC and uploaded to the vehicle computing system, the lists could be selected on the wireless device, or the lists could be input via a vehicle input, such as, but not limited to, a navigation screen display.

In the exemplary system shown with respect to FIG. 4, the vehicle computing system connects to a wireless device 201, receives an incoming call 203, and checks to see if a do not disturb function is active 205. If the do not disturb function is disabled, then the system reports the call 207 as per its standard operation.

If the do not disturb function is active, then, in this illustrative embodiment, the system checks to see if selective do not disturb has been enabled 401. Additionally or alternatively, the system could simply check an "allowed caller" list to see if it is currently populated with any names.

If selective do not disturb is not enabled, or if the incoming call is not from a number on the list 403, then the system ignores the call 209 and sends the signal to the wireless device to similarly silence any notification 211.

If selective do not disturb is enabled and if the incoming call/message is from a number (or name, designation, etc.) on the list of allowable callers/messengers, then the system alerts the driver 207 as if the do not disturb function had not been enabled.

Figure 5:
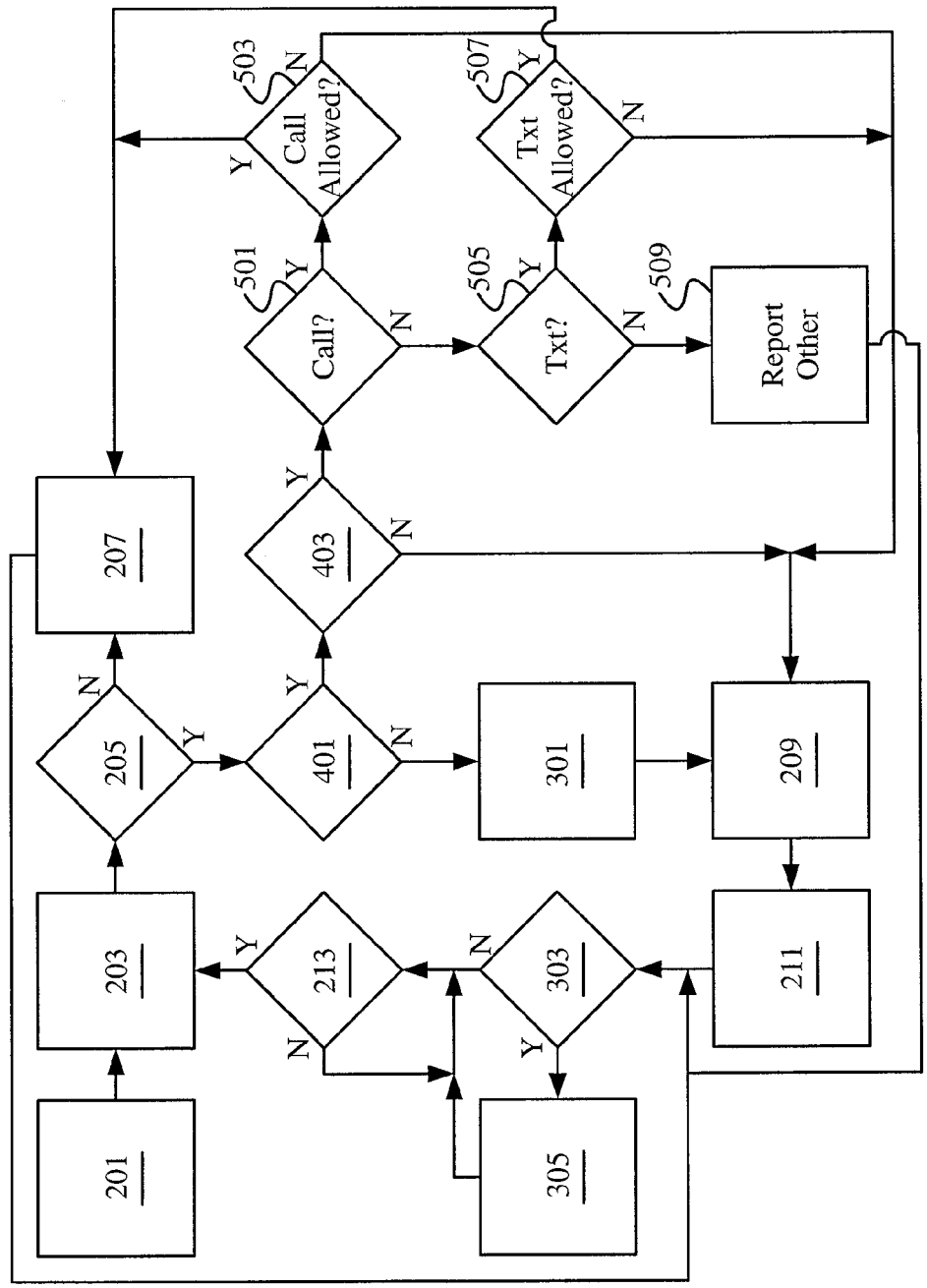
FIG. 5 shows an illustrative, non-limiting example of a system including selectivity based on incoming notification type.

FIG. 5 shows an illustrative, non-limiting example of a system employing aspects of the illustrative examples shown in FIGS. 2-4 and including selectivity based on incoming notification type as well as caller/messenger.

In this illustrative embodiment, the system connects to a wireless device 201 and receives an incoming call/message 203. While the incoming notification has been described herein as a call or message, it can include, but is not limited to, a phone call, a text message, an email alert, an IM message, etc.

If the do not disturb function is not enable 205, then the system handles the incoming notification in a customary manner 207. If do not disturb is enabled, then the system checks to see if selective do not disturb has been enabled 401. If selective do not disturb has not been enabled, then the system will log the incoming call/message 301 and ignore the call/message 209. The system also sends a signal to the wireless device to mute any audible notification 211 (visual notification may also be suppressed). The system then cycles between waiting for a call 213 and checking to see if do not disturb has been disabled 305, at which point it will report the log of missed calls to the driver 305.

If selective do not disturb has been enabled, then the system checks to see if the caller/messenger is on the "allowed" list 403. If not, the system will ignore the call and proceed with step 301. If the caller is on the allowed list, then, in this illustrative embodiment, the system checks to see if the incoming message is a phone call 501, a text message 505 or another type of message 509. If the message is "other" (e.g., not a message type that is recognized, although it is understood that the system is capable of checking for, recognizing and reporting IM, email, etc.), the system reports that an unrecognized communication has been received from an allowed caller 509 and then proceeds with waiting for another incoming call 303.

If the incoming notification type (in this embodiment) corresponds to a call 501 or a text 505, then the system (respectively), checks to see if calls 503 or texts 507 are allowed. It may be the case that the driver does not wish to receive any texts, but does wish to receive calls from certain allowed numbers. In this illustrative embodiment, the driver has the degree of freedom not only to specify who may call or message, but also what types of incoming notifications are or are not ignored. If the type is allowed, then the system reports the notification to the driver 207. If the incoming type is prohibited, then the system proceeds to log the ignored notification 301 and waits for a new notification to arrive.

Additionally, due to delays in processing and wireless communication between a vehicle computing system and a wireless device, it may not be possible to selectively allow certain calls (e.g., all calls may need to be blocked). It is possible, however, to provide a notification when, for example, an "approved" call has been blocked (allowing the driver to call that person back immediately). In another illustrative example, the system could automatically call back blocked calls from an "approved" list. In yet a further illustrative embodiment, if multiple calls came in a short span of time, do not disturb may be temporarily disabled, in case an emergency condition has arisen whereby someone needs to reach the vehicle occupant.

Although this invention has been described in terms of numerous illustrative embodiments, these embodiments are provided by way of example only, and are not intended to limit the scope of the invention, which is defined by the claims.

What is claimed:

1. A computer-implemented method comprising:
receiving, at a vehicle computing system (VCS), notification of incoming communication on a wireless device communicating with the VCS;
determining that a VCS do-not-disturb function is active;
blocking an incoming communication driver notification;
sending a command from the VCS to the wireless device to silence device notification relating to the incoming communication; and
reporting a stored list of blocked communications when the do-not-disturb function is switched from active to inactive.

2. The method of claim 1, wherein the incoming communication is a phone call.

3. The method of claim 1, wherein the incoming communication is a text message.

4. The method of claim 1, wherein the incoming communication is an email message.

5. The method of claim 1, wherein the incoming communication is an instant message.

6. The method of claim 1, wherein the blocking includes electing not to transmit a notification.

7. A vehicle computing system comprising:

a processor, operable to execute one or more logic processes; and a storage device, in communication with the processor and operable to relay one or more logic processes stored therein to the processor, the storage device including:

at least one receiving process to receive a notification that an incoming communication is being sent to a wireless device in communication with the processor;

at least one determining process to determine that a do not disturb routine is active in the processor;

at least one blocking process to block a notification to a driver regarding the incoming communication; and at least one silencing process to send a command from the processor to the wireless device to silence any notification that the wireless device provides in conjunction with the incoming communication;

at least one storing process to store a list of blocked communications; and at least one reporting process to report the list of blocked communications when a do-not-disturb function is switched from active to inactive.

8. The system of claim 7, wherein the incoming communication is a phone call.

9. The system of claim 7, wherein the incoming communication is a text message.

10. The system of claim 7, wherein the incoming communication is an email message.

11. The system of claim 7, wherein the incoming communication is an instant message.

12. The system of claim 7, wherein the blocking includes electing not to transmit a notification.

* * * * *